(12) United States Patent
Zhang et al.

(10) Patent No.: US 11,336,370 B1
(45) Date of Patent: May 17, 2022

(54) INTEGRATED MULTI-CHANNEL PHOTONICS TRANSMITTER CHIP HAVING VARIABLE POWER DIVIDERS

(71) Applicant: Alpine Optoelectronics, Inc., Fremont, CA (US)

(72) Inventors: Xingyu Zhang, Fremont, CA (US); Tongqing Wang, Fremont, CA (US); Dawei Zheng, Fremont, CA (US)

( * ) Notice: Subject to any disclaimer, the term of this patent is extended or adjusted under 35 U.S.C. 154(b) by 0 days.

(21) Appl. No.: 17/191,132

(22) Filed: Mar. 3, 2021

(51) Int. Cl.
*H04B 10/04* (2006.01)
*H04B 10/079* (2013.01)
*H04B 10/50* (2013.01)
*H04B 10/564* (2013.01)

(52) U.S. Cl.
CPC ..... *H04B 10/07955* (2013.01); *H04B 10/506* (2013.01); *H04B 10/564* (2013.01)

(58) Field of Classification Search
CPC ............ H04B 10/07955; H04B 10/506; H04B 10/564; H04B 10/0799; H04B 10/0775; H04B 10/50; H04B 10/40; H04B 10/503; H04B 10/801; H04J 14/0221; H04J 14/02; G02B 6/4215; G02B 6/428; G02B 6/2938; G02B 6/29395
USPC .... 398/182, 183, 188, 192, 195, 197, 38, 94
See application file for complete search history.

(56) References Cited

U.S. PATENT DOCUMENTS

| | | | |
|---|---|---|---|
| 2004/0160596 A1* | 8/2004 | He | H04J 14/0227 356/73.1 |
| 2004/0208414 A1* | 10/2004 | Lee | H04J 14/08 385/14 |
| 2011/0158576 A1* | 6/2011 | Kissa | G02F 1/225 385/3 |
| 2019/0261070 A1* | 8/2019 | Martinho | H04B 10/5165 |
| 2021/0173051 A1* | 6/2021 | Ringwald | G01S 7/495 |

* cited by examiner

*Primary Examiner* — Hibret A Woldekidan
(74) *Attorney, Agent, or Firm* — Cionca IP Law P.C.; Marin Cionca

(57) ABSTRACT

An integrated transmitter chip comprising: at least one input port disposed at a first end; a first variable power divider optically connected to a first input port of the at least one input port, the first variable power divider being tunable to a first splitting ratio; a second and a third variable power dividers each optically connected to the first variable power divider, the second and the third variable power dividers being tunable to a second and a third splitting ratios; and a first and a second optical channels being optically branched from the second variable power divider, and a third and a fourth optical channels being optically branched from the third variable power divider; wherein an optical signal being launched into the first input port and having an input power is caused to be split by the first variable power divider into a first and a second optical signals.

20 Claims, 4 Drawing Sheets

INTEGRATED MULTI-CHANNEL PHOTONICS TRANSMITTER CHIP HAVING VARIABLE POWER DIVIDERS

BACKGROUND OF INVENTION

1. Field of the Invention

The invention relates generally to integrated multi-channel photonics transmitter chips, and more specifically to integrated photonics transmitter chips having variable power dividers.

2. Description of the Related Art

In the field of integrated photonics, integrated photonics transmitter chips, supporting pulse amplitude modulation (PAM) signals (e.g., 400 Gbps DR4 transceivers, supporting four lanes of 100 Gbps 4-level PAM signals) over 500 m-reach parallel single mode fibers at O-band (approximately 1310 nanometers), have become a mainstream solution for next-generation data-center optical interconnects. Conventionally, a DR4 transmitter chip structure comprises four input and output ports, with four optical channels extending between the input and output ports, respectively. In operation, each channel may receive and transmit a laser beam entering each respective input port, the laser beam propagating across the transmitter chip and having the amplitude or the phase of the laser beam adjusted. The laser beams may subsequently be coupled into the single mode fibers via the output ports carrying an output power for various data-center optical applications.

As a first approach, each channel of the transmitter chip may be provided with a laser source, such that four laser sources are optically aligned to the four input ports of the transmitter chip, for example. This first approach may allow the power of each laser signal being transmitted via the transmitter chip to be independently adjusted (by adjusting the power of the laser source, for example), which may be advantageous for the various data-center optical interconnects, as stated above. However, utilizing a total of four laser sources, as stated, may complicate the optical assembly and optical coupling processes due to the total number of laser sources. This approach may also increase the assembly cost and the associated operational costs due to the increase in overall power consumption drawn by the four laser sources. Alternatively, in order to decrease the assembly and operational costs, hybrid lasers can be integrated directly onto the transmitter chip, but such an approach may require costly process development and a highly reliable laser yield (if at least one laser fails, the functionality of the whole chip fails).

Thus, conventionally, the four optical channels of the transmitter chip are configured to share either one single laser source or two laser sources, depending on the constraints of the required optical link budget and the availability of high-power lasers, for example. As a second approach, when a single laser source is used, the transmitter chip structure may be designed as having a single optical input port, followed by three 1×2 splitters (e.g., couplers) cascaded in two subsequent stages, as an example. As a third approach, when two laser sources are used, the transmitter chip structure may be designed as having two optical input ports, followed by two 1×2 splitter couplers, for example. In either the second or the third approach, the splitters are conventionally configured with a 50/50 splitting ratio, such that a laser light beam passing through each splitter/coupler is split equally in half, thus effectively splitting the power of the laser light beam equally in half as well. The split laser signals may then pass through a modulator and a phase shifter as the laser signals propagate along the transmitter chip. A photodetector may be placed on each optical channel following the modulator and phase shifter for power monitoring and quadrature point control, for example. Finally, the laser signals may exit the transmitter chip via the four output ports, each laser signal having a final transmitted output power.

While the second and third approaches described above may result in the transmission of laser light power while simplifying the optical assembly process, the output power of each laser light signal is incapable of being independently adjusted due to the sharing of the laser light source(s) (via the splitters, for example). As such, due to different path length of different channels of the transmitter chip, the optical propagation loss in each channel could be different, causing non-uniform power output. For certain applications, uniform power among all the channels of the transmitter chip is required. Furthermore, should an optical channel on the transmitter chip be defective (due to chip manufacturing process imperfections/variations, for example), the transmitter chip lacks means for compensating or correcting any loss of laser light power due to said optical channel defect or differing path length.

Therefore, there is a need to solve the problems described above by providing an integrated transmitter chip, and method, comprising cascaded variable power dividers for efficiently and cost-effectively tuning the output power of optical signals being transmitted via the integrated transmitter chip.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an integrated transmitter chip is provided. The integrated transmitter chip may comprise: at least one input port disposed at a first end of the integrated transmitter chip; a first variable power divider optically connected to a first input port of the at least one input port, the first variable power divider being tunable to a first splitting ratio; a second and a third variable power dividers each optically connected to the first variable power divider, the second and the third variable power dividers being tunable to a second and a third splitting ratios, respectively; and a first and a second optical channels being optically branched from the second variable power divider, and a third and a fourth optical channels being optically branched from the third variable power divider; wherein an optical signal being launched into the first input port and having an input power is caused to be split by the first variable power divider into a first and a second optical signals, such that the input power is portioned between the first and the second optical signals according to the first splitting ratio, the first and the second optical signals subsequently being propagated toward the second and the third variable power dividers, respectively, and being caused to be split by the second and the third variable power dividers, respectively, into a first and a second pairs of output optical signals each having an output power, the output powers of the first and the second pairs of output optical signals each being portioned according to the second and the third splitting ratios, respectively. Thus, an advantage is the ability to tune and therefore control the splitting ratio of the variable power divider, thus allowing control of the powers of the individual optical signals being transmitted via the transmitter chip. Another advantage is that the disclosed integrated transmitter may accommodate either single or double laser transmission approaches, negating the need for using separate transmitter chips having different designs for either approach, which may thus reduce operational costs associated with purchasing and swapping out more than one transmitter chip. An additional advantage is that the cascaded variable power dividers have the ability to adjust the distribution of the input optical power among all chip channels, such that to meet a desired level of power uniformity at the transmitter output among each channel. Another advantage is the ability to compensate for or correct deficiencies in the output power of the transmitter chip using the variable power dividers, and thus improving the overall production yield. Another advantage of the variable power dividers is the reduction in operational costs associated with channel shut-off requirements, due to the reduced power consumption.

In another aspect, an integrated transmitter chip is provided. The integrated transmitter chip may comprise: a plurality of input ports disposed at a first end of the integrated transmitter chip; at least one variable power divider optically connected to one of the plurality of input ports, the at least one variable power divider being tunable to a splitting ratio; and a plurality of optical channels extending a length of the integrated transmitter chip, a first and a second optical channels of the plurality of optical channels being optically branched from the at least one variable power divider; wherein, when an optical signal having an input power is being launched into the one of the plurality of input ports, the optical signal is caused to be split by the at least one variable power divider into a plurality of output optical signals, such that the input power is portioned among the plurality of output optical signals according to the splitting ratio. Thus, an advantage is the ability to tune and therefore control the splitting ratio of the variable power divider, thus allowing control of the powers of the individual optical signals being transmitted via the transmitter chip. An additional advantage is that the cascaded variable power dividers have the ability to adjust the distribution of the input optical power among all chip channels, such that to meet a desired level of power uniformity at the transmitter output among each channel. Another advantage is the ability to compensate for or correct deficiencies in the output power of the transmitter chip using the variable power dividers, and thus improving the overall production yield. Another advantage of the variable power dividers is the reduction in operational costs associated with channel shut-off requirements, due to the reduced power consumption.

In another aspect, a method of transmitting an optical signal having an input power using an integrated transmitter chip is provided, the integrated transmitter chip comprising a plurality of input ports, at least one variable power divider optically connected to one of the plurality of input ports, the at least one variable power divider being tunable to a splitting ratio, a plurality of optical channels, at least a portion of the plurality of optical channels being optically branched from the at least one variable power divider, and a plurality of photodetectors each optically connected to each of the plurality of optical channels. The method may comprise the steps of: defining output power targets for the plurality of optical channels; tuning the splitting ratio of the at least one variable power divider, the splitting ratio being tunable from a range between 100/0 to 0/100, the tuning of the splitting ratio causing an optical portioning among the at least a portion of the optical channels according to the tuned splitting ratio; launching the optical signal into the one of the plurality of input ports, the optical signal being propagated through the at least one variable power divider, the at least one variable power divider causing a splitting of the optical signal into a plurality of output optical signals, the plurality of output optical signals each having an output power portioned from the input power according to the tuned splitting ratio, the plurality of output optical signals being propagated along the plurality of optical channels, respectively; and measuring the output powers of the plurality of output optical signals via the plurality of photodetectors, respectively, such that to monitor the portioning of the input power by the at least one variable power divider and the transmitting of the optical signal via the plurality output optical signals. Thus, an advantage is the ability to tune and therefore control the splitting ratio of the variable power divider, thus allowing control of the powers of the individual optical signals being transmitted via the transmitter chip. Another advantage of the variable power dividers is optical signal output power control via the optical switching between channels. An additional advantage is the ability to compensate for or correct deficiencies in the output power of the transmitter chip using the variable power dividers, and thus improving the overall production yield. Another advantage of the variable power dividers is the reduction in operational costs associated with channel shut-off requirements, due to the reduced power consumption.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
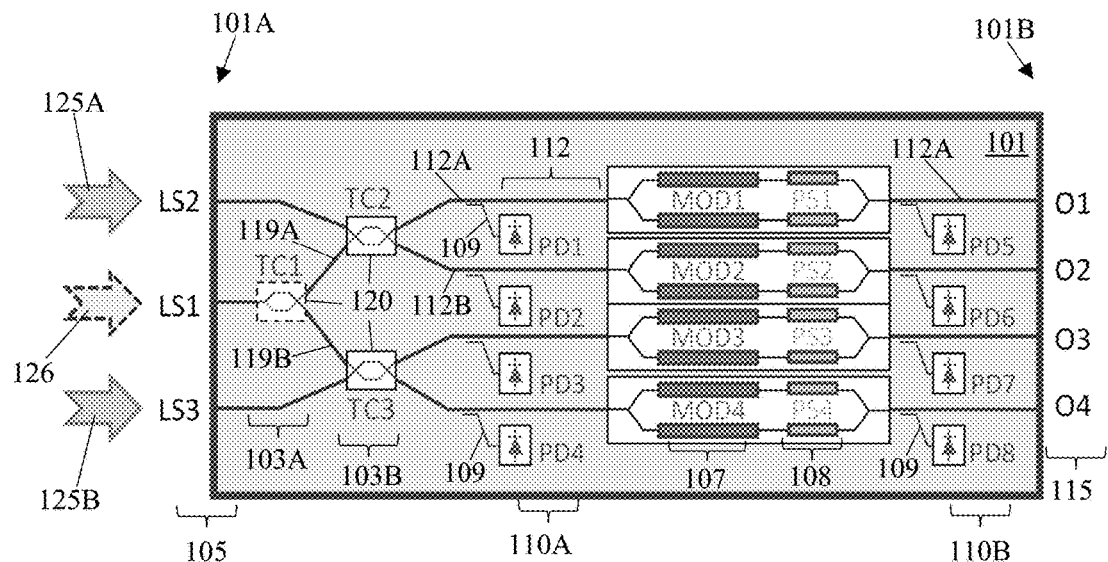
FIG. 1 is a diagram illustrating a top view of an integrated four-channel transmitter chip having cascaded variable power dividers, according to several aspects.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 101 and 201, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 is a diagram illustrating a top view of an integrated four-channel transmitter chip 101 having cascaded variable power dividers 120, according to several aspects. As shown in FIG. 1, the integrated four-channel transmitter chip ("integrated four-channel transmitter chip," "integrated transmitter chip," "integrated transmitter," "transmitter chip") 101 may comprise three input ports 105 (LS1-LS3), for example, disposed at a first end 101A, by which laser light beams ("laser light beams," "laser beams," "laser signals," "optical signals") may be launched into the integrated transmitter 101. The input ports 105 may be edge couplers, for example, or any other suitable optical port. It should be understood that more than three or fewer than three input ports 105 may be provided on the transmitter chip 101, as needed, as will be described in more detail later. As an example, at least one laser source (not shown) may be optically aligned to the first end 101A of the integrated transmitter 101, such that at least one laser beam (e.g., 126) may be transmitted via the optical channels 112 to fibers (disposed in a fiber array, or a lens (array) with a fiber (array), for example) optically aligned to a second/output end 101B of the integrated transmitter 101. As shown in FIG. 1, the transmitter chip 101 may comprise four optical channels 112 extending at least partially a length of the transmitter chip 101, and optically connected to four output ports 115 disposed at the second end 101B, as an example. It should be understood that more or fewer optical channels 112 may be provided on the transmitter chip 101, as needed, and thus, more or fewer than four output ports 115 may be provided as well, such that to match the number of optical channels, as will be discussed later below.

As similarly described in the Background above, each optical channel 112 may be provided with a modulator 107 followed by a phase shifter 108, as shown. As an example, the modulators 107 may be any suitable optical modulators, such as silicon optical modulators, graphene optical modulators, Mach-Zehnder Interferometer-based modulators, etc. for modulating the laser signals propagating along the optical channels 112, for example. Additionally, the phase shifters 108 may be any suitable optical phase shifters, such as thermo-optic phase shifters, silicon photonic phase shifters, etc. for controlling the phase shift of the laser signals propagating along the optical channels 112, for example. Each modulator 107 and phase shifter 108 pair may be followed by a tap coupler 109 and a photodetector (e.g., PD5) 110B, as shown, adapted to measure the power (via the light intensity, for example) of the laser signal propagating toward the output ports 115. The photodetectors 110B (PD5-PD8) may be germanium photodetectors, for example. As an example, the photodetectors 110B may allow an external computer (not shown) to monitor the power of each optical signal being transmitted via the transmitter 101 for tuning of the power, as needed.

As mentioned previously above, the integrated transmitter 101 may comprise three input ports 105 disposed at the first end 101A, as an example. As described previously in the Background above, conventional DR4 transmitter chips may be adapted to transmit laser light originating from either a single laser source or two laser sources. As will be described in detail herein, the transmitter chip 101 shown in FIG. 1 may be adapted to support either approach, such that the same chip can accommodate a single laser source or two laser sources, rather than having to use two separate chips of different design, for example. As shown, the input ports 105 may optically connect to the cascaded variable power dividers 120, provided in two stages 103A and 103B, as an example. As an example, the variable power dividers 120 may be realized using tunable couplers/splitters based on various suitable structures, such as, for example, Mach-Zehnder Interferometer (MZI) switches, multi-port splitters, resonators, Micro-Electro-Mechanical Systems (MEMS), etc. As shown in FIG. 1, the variable power dividers 120 may be provided as 1×2 tunable couplers, as shown by TC1, or as 2×2 tunable couplers, as shown by TC2 and TC3, for example. It should be understood that more than three or fewer than three tunable couplers 120 may be provided on the transmitter chip, as needed, as will be discussed later below.

As described previously in the Background above, DR4 transmitter chips are conventionally provided with passive splitters (couplers) having fixed 50/50 splitting ratios, for example. As discussed, when a laser light beam passes through the splitter, the resultant pair of laser light beams each possesses the same or substantially the same light intensity, and therefore power. The variable power dividers (e.g., tunable couplers) 120 may be adapted to tune their respective splitting ratios from 100/0 to 0/100, as opposed to the fixed 50/50. Therefore, like a conventional passive splitter, the laser light beam passing through the variable power divider 120 may be split into two individual laser light beams, however, the resultant intensity, and therefore power, of each individual laser light beam may be optically portioned and selected by tuning the splitting ratio ranging from 100/0 to 0/100, as an example. Referring back to FIG. 1, the cascaded variable power dividers 120 may split the initial three input ports 105 into the four optical channels

112. As shown, a first tunable coupler TC1 may branch input port LS1 into two waveguides/channels 119A and 119B, for example. Input port LS2 and the waveguide branch 119A may optically connect to a second tunable coupler TC2, as shown, and similarly, the waveguide branch 119B and input port LS3 may optically connect to a third tunable coupler TC3, as an example, at the second stage 103B. The pair of tunable couplers TC2 and TC3 may then each branch off into two arms, thus forming the four optical channels 112, as shown as an example.

As shown, following the variable power dividers 120, the four optical channels 112 may each be provided with a first photodetector (e.g., PD1) 110A. As mentioned above, a second set of photodetectors 110B may be optically connected (via tap couplers 109) to the four optical channels 112 following the phase shifters 108, as shown. The first set of photodetectors 110A (PD1-PD4) may be optically connected to the optical channels 112 each via a tap coupler 109, for example, as shown. The first set of photodetectors 110A may be adapted to detect and monitor the power of the incoming laser light signal (during the initial laser-to-transmitter optical alignment process) and may also provide feedback signals to the external computer (not shown) for controlling of the tunable couplers 120 and for monitoring the power variation of the laser light signals during operation of the transmitter chip, for example. Thus, an advantage is the ability to tune and therefore control the splitting ratio of the variable power dividers, thus allowing control of the powers of the individual optical signals being transmitted via the optical channels of the transmitter chip.

As mentioned above when referring to FIG. 1, the integrated transmitter 101 may be configured to support either a single laser source or two laser sources, such that both approaches are supported using the single disclosed transmitter chip, for example. Thus, in accordance with an aspect of the current invention, a method of transmitting optical power from a single or a dual laser source using the disclosed integrated transmitter chip of FIG. 1 is provided, which will be described in detail below.

As shown previously in FIG. 1, let a single laser source (not shown) be used to transmit optical power, as a first case. As an example, the single laser source (not shown) may launch a laser light beam 126 into the input port 105 at LS1, as shown. The laser light beam 126 may enter the transmitter chip 101 via the input port LS1 and may propagate toward the first tunable coupler TC1, as an example. The laser light beam may be optically split by the first tunable coupler TC1, the two resultant light beams each having a power defined by the splitting ratio defined by the first tunable coupler TC1. The now two laser light beams (not shown) may propagate along waveguides 119A and 119B toward the second stage (103B) second and third tunable couplers TC2 and TC3, respectively, such that the two laser light beams (not shown) are split into four laser light beams (not shown) now propagating along the four optical channels 112, as an example. The first set of photodetectors 110A may continuously measure the power of the four laser light beams (not shown), such that to monitor the functionality and efficiency of the splitting ratios set by the variable power dividers 120, for example. The splitting ratios of the variable power dividers 120 may be adjusted, as needed, as will be discussed in more detail below, to make any power adjustments. The laser light beams (not shown) may be directed through the modulators 107 and the phase shifters 108 and may be coupled out of the transmitter chip 101 via the output ports 115, as shown as an example. Thus, the disclosed transmitter chip 101 may efficiently enable the transmission of laser light power originating from a single laser source.

As a second case, let two laser sources (not shown) be used to transmit optical power, as an example. As shown as an example, the two laser sources (not shown) may launch a first and a second laser light beams 125A and 125B, respectively, into the input ports 105 at LS2 and LS3, respectively. The laser light beams 125A and 125B may enter the transmitter chip 101 via the input ports LS2 and LS3, respectively, and may propagate toward the second and the third tunable couplers TC2 and TC3, respectively, as an example. The first and the second laser light beams 125A, 125B may be split by the second and the third tunable couplers TC2, TC3, respectively, such that the four resultant light beams possesses a power defined by the splitting ratios of the second and the third tunable couplers TC2 and TC3, respectively. The four laser light beams (not shown) may propagate along the four optical channels 112, as an example, and the first set of photodetectors 110A may continuously measure the power of the four laser light beams (not shown), such that to monitor the functionality and efficiency of the splitting ratios set by the tunable couplers 120, as similarly described above. The laser light beams (not shown) may be directed through the modulators 107 and the phase shifters 108 and may be coupled out of the transmitter chip 101 via the output ports 115, as shown as an example. Thus, the disclosed transmitter chip 101 may efficiently enable the transmission of laser light power originating from two laser sources. As an example, to achieve certain power uniformity levels at the output 101B, it may be required or preferable to also adjust the input laser power, which will be described in more detail below. It should be noted that, as described above, the three input ports 105 will not all simultaneously be used during any given operation, such that, in other words, either LS1 is used with a single laser or LS2 and LS3 are used with two lasers, respectively. Thus, an advantage is that the disclosed integrated transmitter may accommodate either single or double laser transmission approaches, negating the need for using separate chips of different design for either approach, which may thus reduce operational costs associated with purchasing and swapping out more than one transmitter chip.

As described throughout this disclosure above, the variable power dividers 120 shown in FIG. 1 may enable the selection of splitting ratios ranging from 100/0 to 0/100, rather than the fixed 50/50 splitting ratio of conventional splitters. As will be described in detail below, the use of tunable couplers provides a number of recognizable benefits. As a first benefit, the cascaded variable power dividers 120 enable optical switching among the four optical channels, and thus channel shut off, which will be discussed in greater detail later, such that, by setting any one of the tunable couplers 120 to have a splitting ratio of 100/0 or 0/100, a particular optical channel may be shut off (corresponding to the 0 in the splitting ratio), whereby no optical signal can travel along that particular optical channel. Thus, an advantage of the variable power dividers is optical signal output power control via the optical switching between channels. As a second benefit, the tunable couplers 120 may provide the ability to adjust the transmitter output power uniformity with respect to the four optical channels 112. As an example, depending on the optical application, some particular level of power uniformity may be required. In some cases, the four optical channels 112 may have different routing lengths on the chip 101, and may thus experience different levels of loss, resulting in different levels of output optical power across the output ports 115. By tuning the splitting ratios of the variable power dividers 120, the final output power of each optical channel 112 at the output 101B of the transmitter chip 101 can be adjusted, as needed, to meet that particular level of power uniformity. In comparison, conventional splitters having fixed splitting ratios provide a fixed level of power uniformity and would thus not be able to meet certain power uniformity levels. Thus, an advantage is the ability to tune the power splitting ratio of the input optical signal, such that to meet a desired level of power uniformity at the transmitter output.

As another benefit, the variable power dividers 120 shown previously in FIG. 1 may allow the transmitter chip 101 to correct and/or compensate for instances of failed and/or diminished output power. As described briefly previously in the Background above, in certain situations transmitter chip operation may be hindered by a low output power on a certain optical channel on the transmitter chip, due to unpredicted defects on an optical channel, roughness at the facets due to the presence of dust or dirt particles, imperfect fiber array channel spacing at the output of the transmitter, etc., for example, resulting in lower total output power than expected. While the conventional approaches provide no means for addressing instances of power loss or failure, the variable power dividers (e.g., tunable couplers) 120 disclosed herein may allow optical power from one channel to be directed (in some quantity) to another channel to overcome the output power loss or failure. As an example, referring to FIG. 1, should the first optical channel 112A possess some defect (one of those mentioned above), such that the output power of the optical signal exiting output port O1, as shown, is lower than expected, the tunable coupler TC2 may appropriately be controlled (via the external computer, for example), such that the splitting ratio of the tunable coupler TC2 is gradually adjusted from default 50/50 (50% to channel 112A, 50% to channel 112B) to another splitting ratio, until the measured output power of channel 112A and channel 112B are equal or substantially equal. In this way, both channel 112A and channel 112B have reasonable output power. It should be understood that the photodetectors PD1 and PD2 may monitor the power in channels 112A and 112B, respectively, such that the computer (or user) can ensure correct functionality, as will be described in greater detail when referring to FIG. 2 below. Thus, the power that was being lost via channel 112A at output port O1 has been compensated for via the now equal output power at output port O2 via channel 112B, as an example.

Thus, an advantage is the ability to compensate for or correct deficiencies in the output power of the transmitter chip using the variable power dividers, and thus improving the overall production yield. The increase in overall production yield is a particularly significant advantage of the disclosed photonics transmitter chip. In contrast, conventional multi-channel DR4 transmitter chips typically have lower overall production yield. It should be understood that all of the above-described advantages may be relevant for either the single laser case or the dual laser case.

As mentioned above, the variable power dividers 120 may enable optical channel shut-off, such that no optical signal is outputted from a particular optical channel (112) on the transmitter chip 101, for example. As an example, in practice, it may be required by operation specifications that the transmitter output power of one or a few optical channels be able to be shut-off, usually requiring about 15 dB~30 dB (decibel) attenuation to effectively extinguish the optical signal power. Although carrier-injection based variable optical attenuators (VOAs) can be optically integrated onto each optical channel for initiating channel shut-off, injection current of as large as hundreds of milliamperes is required to obtain a minimum of 15 dB attenuation, which greatly increases the overall power consumption of the DR4 transmitter. As an example, achieving 15 dB optical attenuation using integrated VOAs may require about 0.15-0.30 Watts (W) of additional power for a single optical channel only a few millimeters (mm) in length. As such, when more than 15 dB of optical attenuation is required, or if more than one optical channel is required to be shut-off, the overall power consumption rises even more. To combat this increase in overall power consumption, the length of the VOA integrated onto each optical channel can be increased. However, this increase in VOA length for each optical channel increases the transmitter chip size and the optical propagation loss, as well as decreases the overall production outputs. Moreover, VOAs have been shown to be sensitive to variations in temperature, which may hinder transmitter performance. The attenuation capability of the VOAs is sensitive to process variation, making it difficult to effectively control the VOA yield, as an example.

The variable power dividers 120 disclosed herein may serve as an efficient and cost-effective alternative for the integrated VOAs described above. As similarly described above, should one of the optical channels (e.g., 112A) be required to shut-off, due to product specifications, the tunable coupler TC2 may be tuned, by adjusting the splitting ratio to 0/100, for example, to effectively negate any power output along channel 112A, and thus effectively shutting off channel 112A, as needed per the example. In order to reduce any output power spikes incurred by the shutting off of channel 112A, as an example, tunable coupler TC1 may also be tuned and the input power of the laser source may also be adjusted, for example, to reduce the effective input laser power accordingly, such that the same optical power level is maintained at the output 101B. As similarly mentioned above, the control algorithm of the computer can be further adapted to control the channel shut-off process, such that, depending on product specifications, the optical channels may be optically attenuated upwards of over 25 dB with electrical power consumption below 20 mW. Thus, particularly in comparison to carrier-injection based VOAs, the required power consumption of the tunable couplers for channel shut-off is greatly reduced. Thus, an advantage of the cascaded variable power dividers is the reduction in operational costs associated with channel shut-off requirements, due to the reduced power consumption.

Figure 2:
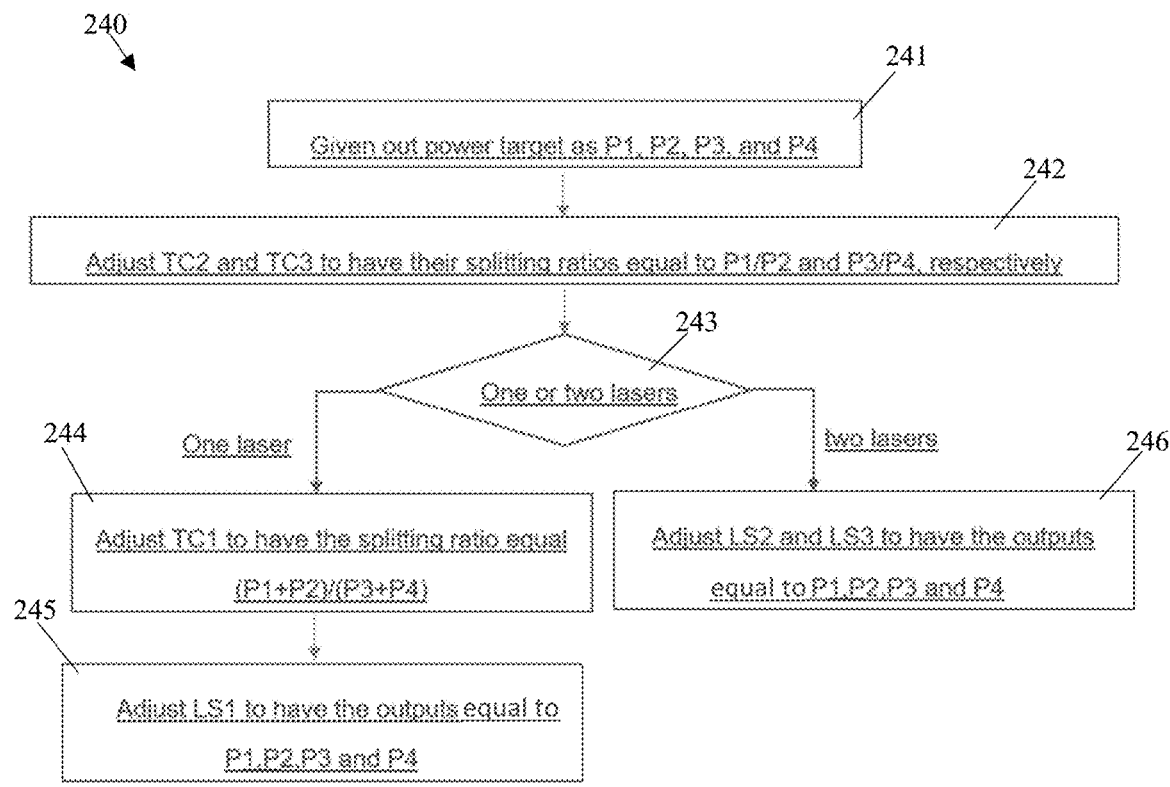
FIG. 2 is a flowchart illustrating a control algorithm for monitoring and varying the optical power of an input optical signal being transmitted via the integrated four-channel transmitter chip of FIG. 1, according to an aspect.

FIG. 2 is a flowchart illustrating a control algorithm 240 for monitoring and varying the optical power of an input optical signal being transmitted via the integrated four-channel transmitter chip of FIG. 1, according to an aspect. As mentioned above, in practice, the transmitter chip may be in electrical communication with an external computer programmed with a control algorithm. Specifically, the computer may be in electrical communication with the variable power dividers (120) and the sets of photodetectors (110A and 110B), shown previously in FIG. 1. As described above as an example, the tunable couplers may be controllable such that their respective tuning/splitting ratios may be adjusted. The control algorithm operating on the computer may be adapted to set the tuning ratios, based on power data collected via the photodetectors (110A and 110B), such that the tunable couplers (120) may be controlled in real-time, as an example. Thus, the adjusting and setting of the splitting ratios may be automated during use of the integrated transmitter chip, such that any detected power loss may be compensated for/corrected by the dynamic adjustment of the splitting ratios, as an additional benefit. As will be described in detail below, the control algorithm may thus enable the computer to autonomously control the adjustment of the variable power dividers using the power measured via the photodetectors.

As shown in FIG. 2, for a given 4-channel application, as an example, let the laser light signals being output from the output ports O1-O4 (115 in FIG. 1) have an output power, as described previously throughout this disclosure above. As indicated at 241, upon initial operation of the 4-channel transmitter chip, the laser light signals being output from the transmitter chip may be given a certain output power target, defined as P1, P2, P3, and P4 for output ports O1-O4, respectively. Once the P1-P4 values have been set (autonomously by the computer, by a user, preset by a programmer, etc.), the second stage (e.g., 103B in FIG. 1) variable power dividers (120) may be adjusted. As shown at 242, the splitting ratios of the tunable couplers TC2 and TC3 may be set to P1/P2 and P3/P4, respectively. The control algorithm 240 may utilize the power readings measured by the photodetectors P1-P8 (110A and 110B in FIG. 1) to monitor the powers P1, P2, P3, and P4 during this process, as an example. As described in detail previously when referring to FIG. 1, the 4-channel integrated photonics transmitter chip disclosed herein may function with and accommodate a single laser source or a dual laser source. As indicated at 243, depending on whether a single laser or a double laser is being used with the transmitter chip, the control algorithm 240 may proceed with one of two paths, as will be described below.

Accordingly, if one laser is being used to transmit laser light through the transmitter chip, as shown at 244, the splitting ratio of the tunable coupler TC1 (shown in FIG. 1, for example) may be set to (P1+P2)/(P3+P4). Subsequently, as shown at 245, the single laser source may be adjusted until the power outputs are equal to the desired output power targets P1, P2, P3 and P4 for the output ports O1-O4, respectively. On the other hand, if two laser sources are being used to transmit laser light through the transmitter chip, as shown at 246, the two laser sources may be adjusted until the power outputs are equal to the desired output power target P1, P2, P3 and P4 for the output ports O1-O4, respectively, and thus signifying an optimal transmission of optical power.

It should be understood that the above-described control algorithm may alternatively be executed manually, by, for example, a user, as desired. It should also be understood that the control algorithm shown and described in FIG. 2 may be expanded and modified accordingly to accommodate larger or smaller multi-channel transmitter chips, such as, for example, 2-channel, 3-channel, 5-channel, 8-channel, 16-channel, etc., chips. It should also be understood that the control algorithm 240 described above may be applied for channel-shutoff, described previously when referring to FIG. 1, for example, by setting any output power target to zero (e.g., P1=0).

Figure 3:
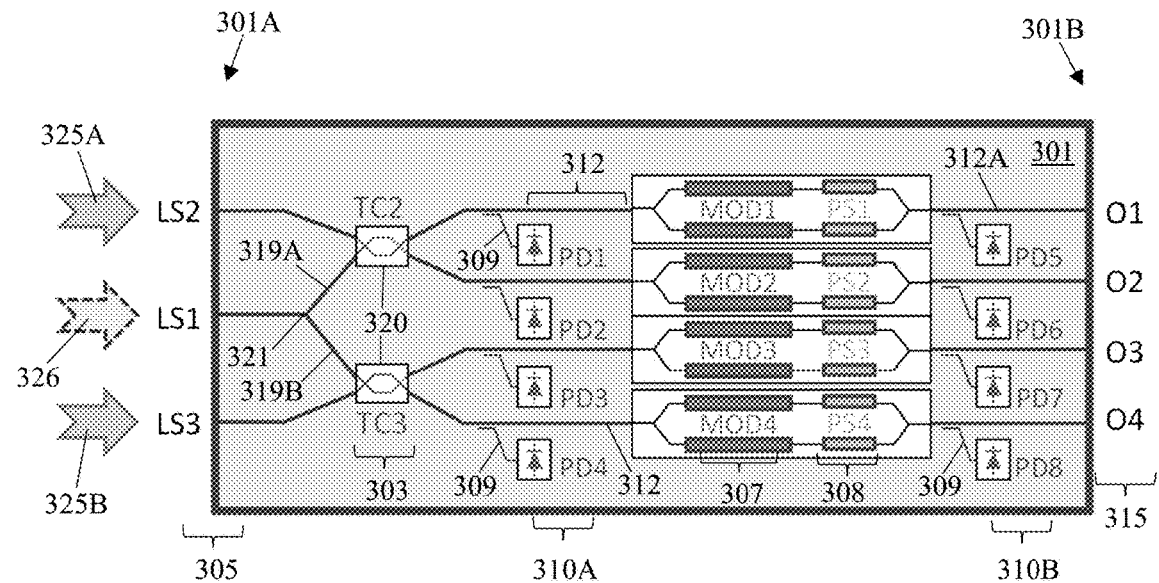
FIG. 3 is a diagram illustrating a top view of an alternative embodiment of the integrated four-channel transmitter chip of FIG. 1, according to an aspect.

FIG. 3 is a diagram illustrating a top view of an alternative embodiment 301 of the integrated four-channel transmitter chip 101 of FIG. 1, according to an aspect. As an example, the alternative embodiment 301 of the transmitter chip 101 described throughout this disclosure above may be used with a single laser source or two laser sources for the transmission of laser light power, as similarly described above. As shown in FIG. 3, the integrated transmitter chip 301 may comprise the three input ports 305, the four optical channels 312 extending at least partially a length of the transmitter chip 301, and the four output channels 315. Additionally, as described above when referring to FIG. 1, each optical channel 312 may comprise two sets of photodetectors 310A and 310B, as shown, and an integrated modulator 307 and phase shifter 308, for example. As will be discussed in more detail below, this alternative embodiment 301 may comprise two variable power dividers 320, as opposed to the three shown previously in FIG. 1.

As shown in FIG. 3, the transmitter chip 301 may comprise a splitter (e.g., a 1×2 coupler) 321 having a fixed splitting ratio of 50/50, such as those conventionally used in integrated photonics, in place of the first-stage variable power divider (e.g., tunable coupler TC1) shown previously in FIG. 1. The two variable power dividers 320 (tunable couplers TC2 and TC3) may be provided parallelly in a single stage 303 following the splitter 321, as shown as an example. The variable power dividers 320 may be 2×2 tunable couplers, for example, as described previously above. As shown, the splitter 321 and the tunable couplers 320 may optically connect (via waveguides, for example) to the three input ports 305. As an example, the input port LS1 may optically connect to the splitter 321, which may branch off into two waveguides/channels 319A and 319B, which may optically connect to the tunable couplers TC2 and TC3, respectively, as shown. Input ports LS2 and LS3 may also optically connect to the tunable couplers TC2 and TC3, respectively. The tunable couplers TC2 and TC3 may then each branch off into two branches, such that to form the four optical channels 312, as similarly described previously above. As mentioned above, the splitter 321 may be a conventional 1×2 coupler, for example, such that the splitting ratio of the splitter 321 is fixed at 50/50. Thus, as described above, optical signals passing through the splitter 321 will be split equally in half, such that the resultant powers of the split outgoing signals are the same (or substantially the same) value, for example. Thus, in this embodiment 301, only the tunable couplers TC2 and TC3 may be tuned, such that their respective splitting ratios may be adjusted, as an example.

As mentioned above, the transmitter chip 301 may be adapted to support either the single laser approach or the dual laser approach, as similarly described when referring to FIG. 1. As shown, let a single laser source (not shown) be optically aligned to the input port LS1 of the first end 301A of the transmitter chip 301, as an example. The single laser source (not shown) may launch laser light 326 into the transmitter chip 301 via the input port LS1, as shown as an example. The laser light signal 326 may propagate toward the splitter 321, and may be split in half, for example, such that the resultant laser light beams (not shown) possess the same power. The split laser light beams (not shown) may each propagate along waveguides 319A and 319B toward the tunable couplers TC2 and TC3, respectively, as shown, such that each laser light beam may be split a second time, according to the splitting ratio of each tunable coupler TC2, TC3, respectively, for example. The resultant four laser light beams (not shown) may propagate along the four optical channels 312 and be coupled out of the transmitter chip 301, such that the output optical power is transmitted to an external device (not shown) aligned at the output end 301B, for example.

While the splitter 321 cannot be tuned in the same manner as tunable coupler TC1 (shown in FIG. 1), for example, because of the presence of the variable power dividers 320, the tuning capabilities of the transmitter chip 301 are maintained. As an example, the splitting ratio of each tunable coupler TC2, TC3 may be specifically set such that to effectively achieve a certain level of power uniformity or power ratio, as needed. For example, let it be desired that the level of power ratio at the output 201B for an incoming laser signal having 100% of an initial power be as follows: 12.5% of the input power at O1, 37.5% of the input power at O2, 37.5% of the input power at O3, and 12.5% of the input power at O4, as a simplified example. Knowing that the splitter 321 will divide the incoming laser signal (e.g., 326) in half, such that the resultant power of each split signal will be 50% of the original power, the tunable coupler TC2 may be tuned to have a splitting ratio of 25/75, such that the light signal exiting from output port O1 possesses a power that is 12.5% of the initial power, and that the light signal exiting from output port O2 possesses a power that is 37.5% of the initial power, per the example. Similarly, the tunable coupler TC3 may be tuned to have a splitting ratio of 75/25, such that the light signal exiting from output port O3 possesses a power that is 37.5% of the initial power, and that the light signal exiting from output port O4 possesses a power that is 12.5% of the initial power, for example. Thus, having the pair of tunable couplers TC2 and TC3 may allow control over the tuning of the output power across the four output ports 315. Moreover, due to the replacement of the first variable power divider (e.g., TC1) with the conventional splitter 321, an advantage is the further reduction in manufacturing costs as compared with the embodiment 101 of FIG. 1.

In general, for some applications the tuning of only tunable couplers TC2 and TC3 is sufficient, so the control of the tuning of the splitting ratios of the tunable couplers TC2 and TC3 in the embodiment of FIG. 3 may thus be simplified. As described previously above when referring to FIG. 2, the transmitter chip disclosed herein may be provided with a control algorithm adapted to selectively control the tuning of the splitting ratios. For the single laser case, as mentioned above, the tunable couplers TC2 and TC3 may be tunable for any splitting ratio of P1/P2 and P3/P4, respectively, which may yield a sufficient power output uniformity for certain applications. However, because the splitter 321 is fixed at a 50/50 splitting ratio, it should be noted that certain desired levels of output power uniformity or power ratio may not be achievable in this case. For these more complex combinations of output power percentages for the single laser case, which would thus require a higher number of variable power dividers, it may be preferable to utilize the transmitter chip 101 of FIG. 1, for example.

In the dual laser source case, as an example, two laser sources (not shown) may launch two optical signals 325A and 325B into the input ports LS2 and LS3, respectively, as similarly described when referring to FIG. 1. Since the laser light signals 325A and 325B do not pass through the splitter 321 when propagating along the transmitter chip 301, the splitter 321 essentially has no effect on the dual laser case shown in FIG. 3. As such, the embodiment 301 shown in FIG. 3 is essentially the same, in terms of functionality, as the embodiment 101 of FIG. 1 for the dual laser case, since in both transmitter chip variations the two incoming laser light beams 325A/125A and 325B/125B are only acted upon by the tunable couplers TC2 and TC3, respectively. Thus, the operation of the transmitter chip 301 for the dual laser case is the same as that described above when referring to FIG. 1. Additionally, the tunable couplers TC2 and TC3 may be tuned and controlled according to the control algorithm described previously above when referring to FIG. 2, for the dual laser case. Thus, in terms of manufacturing costs, the embodiment of the transmitter chip 301 shown in FIG. 3 may be preferable for the dual laser case.

It should be understood that all the operations described above with reference to the transmitter chip 301 may be automated, as described previously when referring to FIG. 1, via the control algorithm (FIG. 2) in an external computer, for example. Compared with the transmitter chip of FIG. 1, automated control of the transmitter chip 301 shown in FIG. 3 may be slightly more simplified, since the computer only needs to tune two variable power dividers, as opposed to the three of FIG. 1, for example. Furthermore, the configuration shown in FIG. 3 may still enable channel shut-off, as described previously when referring to FIG. 1, as a benefit for meeting certain product specifications. As will be described throughout this disclosure below, the transmitter chip 301 may be further modified and/or simplified, such that the transmitter chip is adapted specifically for either the single laser case or the dual laser case.

Figure 4:
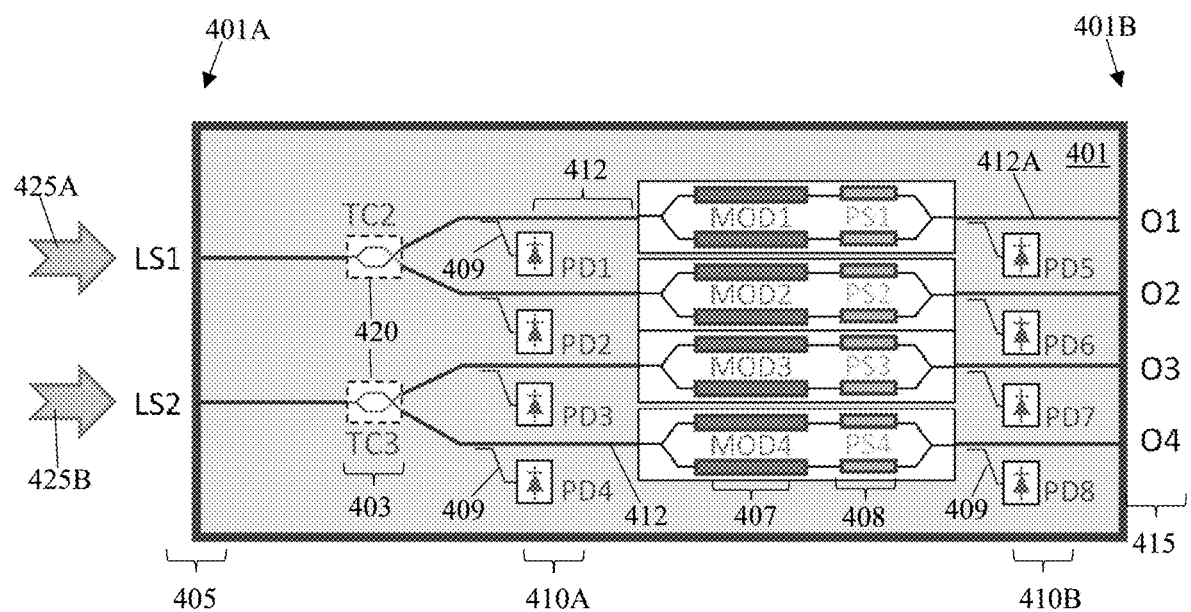
FIG. 4 is a diagram illustrating a top view of a two-input integrated four-channel transmitter chip having variable power dividers, according to an aspect.

FIG. 4 is a diagram illustrating a top view of a two-input integrated four-channel transmitter chip 401 having variable power dividers 420, according to an aspect. As mentioned above, the integrated transmitter chip disclosed throughout this disclosure may be modified such that to accommodate specifically either the single laser case or the dual laser case. As will be described in detail below, the transmitter chip 401 shown in FIG. 4 may be configured specifically for use with two laser sources (not shown).

As shown in FIG. 4, the transmitter chip 401 may be provided with two input ports 405 (LS1 and LS2) optically connected to two variable power dividers 420 (tunable couplers TC2 and TC3), respectively. As shown, the tunable couplers TC2 and TC3 may be provided in a single stage 403, each being provided as a 1×2 tunable coupler, as opposed to the 2×2 tunable couplers shown previously in FIGS. 1 & 3, for example. As shown, the transmitter chip 401 may be a multi-channel chip comprising four optical channels 412, for example, where the optical channels 412 have two sets of photodetectors 410A and 410B, a set of modulators 407, a set of phase shifters 408, and four output ports 415, as similarly described throughout this disclosure above. As shown, the first input port LS1 may optically connect to the input of the tunable coupler TC2 and may be branched off into a first pair of optical channels of the four optical channels 412. Similarly, as shown, the second input port LS2 may optically connect to the input of the tunable coupler TC3 and may be branched off into a second pair of optical channels of the four optical channels 412, for example. The input ports LS1 and LS2 may receive two incoming laser beams 425A and 425B, respectively, as shown, which may be directed toward and subsequently split by the pair of tunable couplers TC2 and TC3, as similarly described throughout this disclosure above. Thus, the optical power of two incoming laser light beams being split into four laser light beams may be effectively transmitted to an external device (e.g., a fiber array) (not shown) optically aligned to the output ports O1-O4 at the output edge 401B of the transmitter chip 401, as an example.

As similarly described above, the tunable couplers TC2 and TC3 may be tunable, such that their respective splitting ratios may be adjusted and controlled (via the external computer, for example). The first set of photodetectors 410A may measure the light intensity, and thus the power, of each of the signals travelling along the optical channels 412, such that to aid the external computer in monitoring the power and thus the tuning of the splitting ratios, as described above. As described throughout this disclosure above, the tunable couplers TC2 and TC3 may control the output power of the transmitter chip via their respective splitting ratios (following the control algorithm shown in FIG. 2, for the dual laser case) and may thus also enable channel shut-off for effectively closing one or more optical channels 412, as an example. As stated above, it should be understood that the embodiment of the transmitter chip 401 shown in FIG. 4 is specifically designed for use with two laser sources for the transmission of optical power. Thus, due to the omission of the third input port and the splitter (e.g., 321 in FIG. 3) or the first-stage tunable coupler (e.g., TC1 in FIG. 1), the footprint of the chip can be smaller, increasing the production output, as well as reducing the manufacturing costs associated with manufacturing the transmitter chip 401. Thus, it may be preferable to utilize the embodiment 401 of FIG. 4 when transmitting optical power using two laser sources. Furthermore, as similarly described above when referring to FIG. 3, the omission of the first-stage variable power divider (e.g., tunable coupler TC1) may also further simplify the control algorithm programmed to control the splitting ratios of the variable power dividers 420, as an example.

Figure 5:
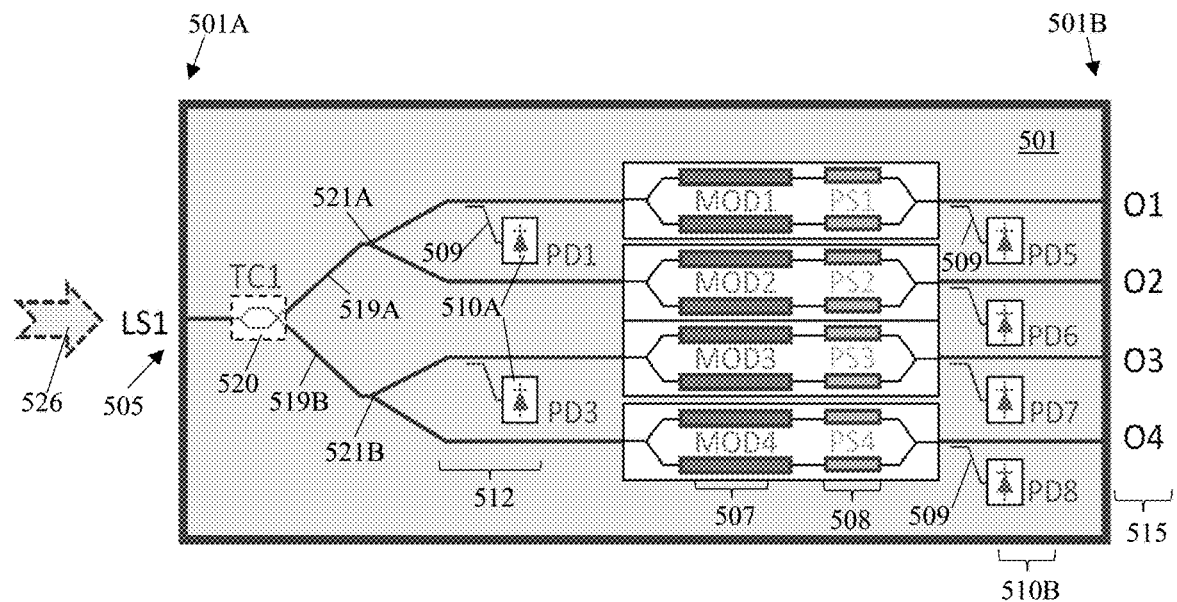
FIG. 5 is a diagram illustrating a top view of a single-input integrated four-channel transmitter chip having a variable power divider, according to an aspect.

FIG. 5 is a diagram illustrating a top view of a single-input integrated four-channel transmitter chip 501 having a variable power divider 520, according to an aspect. As described above, the integrated transmitter chip disclosed herein may be modified, such that to accommodate specifically the dual laser case, as shown previously in FIG. 4. As will be described in detail below, the transmitter chip 501 shown in FIG. 5 may be configured specifically for transmitting optical power originating from a single laser source.

As shown in FIG. 5, the transmitter chip 501 may be provided with a single input port 505 (LS1) optically connected to a single 1×2 variable power divider 520 (e.g., tunable coupler TC1), as an example. As shown, the tunable couplers TC2 and TC3, shown previously in FIG. 4, for example, may be provided as 1×2 splitters, for example. As shown, the transmitter chip 501 may be a multi-channel chip comprising four optical channels 512, where the optical channels 512 have a first and a second set of photodetectors 510A and 510B, respectively, disposed before and after a set of modulators 507 and a set of phase shifters 508, respectively, and finally four output ports 515 (O1-O4), as similarly described previously above. For emphasis, as opposed to the previous embodiments shown in FIGS. 1 & 3-4, the transmitter chip 501 of FIG. 5 may need only two photodetectors PD1 and PD3, as shown, in the first set of photodetectors 510A disposed before the modulators 507, as mentioned above. Because only one variable power divider 520 is provided on the transmitter chip 501, utilizing the photodetectors PD1 and PD3 disposed after the splitters 521A and 521B, respectively, as shown, may be sufficient for providing feedback data (e.g., power measurements) to the external computer, for example, regarding the tuning of the tunable coupler TC1. Thus, due the omission of the second stage variable power dividers (e.g., tunable couplers TC2 and TC3) and two photodetectors of the first set of photodetectors (e.g., PD2 and PD4) the transmitter chip 501 may be more compactly designed, thus reducing manufacturing costs, as an advantage.

As shown, the input port LS1 may optically connect to the input of the variable power divider (tunable coupler TC1) 520 and may be branched off into two optical channels/waveguides 519A and 519B. The branched waveguides 519A and 519B may optically connect to the pair of splitters 521A and 521B, respectively, disposed on the transmitter chip 501, as shown. As similarly described above, the splitters 521A and 521B may be conventional splitter couplers, whose splitting ratios are each fixed at 50/50, for example. The branched waveguides 519A and 519B may each be split equally by the splitters 521A and 521B, respectively, and may thus form the four optical channels 512, as shown. The input port 505 may receive an incoming laser beam 526, as shown, which may be directed toward and subsequently split by the variable power divider 520, as similarly described throughout this disclosure above. The resultantly split light beams (not shown) may then propagate along the waveguide branches 519A and 519B toward the pair of splitters 521A and 521B, respectively, and may subsequently be split a second time, such that four laser light beams (not shown) may propagate along the optical channels 512. Thus, the optical power of the incoming laser light beam being split into four laser light beams may be effectively transmitted to a fiber array (not shown) optically aligned at the output 501B of the transmitter chip 501, as an example.

As similarly described above, the variable power divider 520 may be tunable such that the splitting ratio may be adjusted and controlled (via an external computer, for example). As shown, the tuning of the input power may occur prior to the splitting of the optical signal by the splitters 521A and 521B, for example. Thus, the control algorithm (described previously when referring to FIG. 2) may be adapted, based on product specifications, constraints, and/or desired output power, to tune the splitting ratio of TC1 with respect to the fixed 50/50 splitting ratios following afterwards (corresponding to the splitters 521A and 521B). The first set of photodetectors 510A may measure the powers of two of the signals being split by the splitters 521A and 521B, and the second set of photodetectors 510B may measure the powers of the four optical signals travelling along the optical channels 512, such that to aid the external computer in monitoring the tuning functionality, as described above. As an example, the variable power divider 520 may control the output power of the transmitter chip 510 via its splitting ratio and may thus also enable channel shut-off. However, because only one variable power divider 520 is used in this embodiment 501, either outputs O1 and O2 will be closed, or outputs O3 and O4 will be closed. As such, if the shutting off of only one optical channel is desired, the embodiment 501 shown in FIG. 5 may not be preferable. On the other hand, for example, it may be possible to substantially enact single channel shut off using other on-chip means than the tunable coupler 520, such as VOAs (as described above), the phase shifters 508, etc.

As stated above, it should be understood that the embodiment of the transmitter chip 501 shown in FIG. 5 is specifically designed for use with a single laser source in the transmission of optical power. Thus, due to the omission of the second and third input ports (e.g., LS2 and LS3) and the second and the fourth photodetectors (e.g., PD2 and PD4), the footprint of the chip can be smaller, benefiting the production volume, as well as reducing the manufacturing costs associated with manufacturing the transmitter chip 501. Thus, it may be preferable to utilize the embodiment 501 of FIG. 5 when transmitting optical power using one laser source. Furthermore, as similarly described above when referring to FIG. 4, the omission of the second-stage variable power dividers (e.g., tunable couplers TC2 and TC3) may also further simplify the control algorithm programmed to control the splitting ratio of the variable power divider 520, as an example.

As mentioned previously throughout this disclosure above, the integrated transmitter chip disclosed herein may comprise any number of optical channels, greater or lesser than the four channels shown in the drawings previously.

Additionally, as will be described herein below, the integrated transmitter chip may be provided with a greater number of input ports than the three shown herein previously (e.g., LS1-LS3). Finally, as will also be described in detail below, the integrated transmitter chip may comprise a larger number of variable power dividers than the three shown previously in the drawings (e.g., tunable couplers TC1-TC3).

Figure 6:
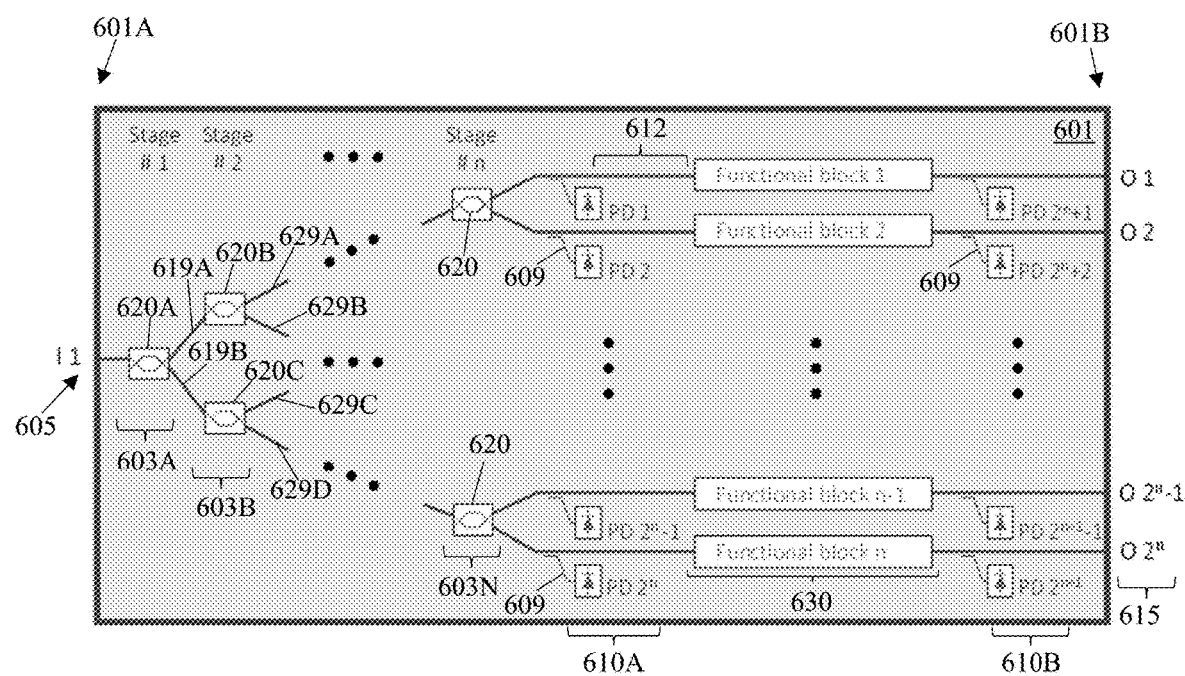
FIG. 6 is a diagram illustrating a top view of a single-input integrated multi-channel transmitter chip having n-stage cascaded variable power dividers, according to an aspect.

FIG. 6 is a diagram illustrating a top view of a single-input integrated multi-channel transmitter chip 601 having n-stage cascaded variable power dividers 620, according to an aspect. As shown in FIG. 6, the integrated multi-channel transmitter chip 601 may comprise a single input port 605 (I1) disposed at a first end 601A. Thus, as will be described in detail below, the transmitter chip 601 shown in FIG. 6 may be configured specifically for transmitting optical power originating from a single laser source and may thus be an alternative embodiment of that shown previously in FIG. 5, as an example.

As shown, the integrated transmitter chip 601 may comprise an n number of stages of cascaded variable power dividers 620, as an example. As opposed to the previously described embodiments of the disclosed integrated transmitter chip, the embodiment 601 shown in FIG. 6 showcases that many more than three variable power dividers may be provided on a single chip, as needed, depending on the size of the chip and the number of optical channels 612, for example. As shown as an example in FIG. 6, the input port I1 may be adapted to receive laser light and may optically connect to a first variable power divider 620A disposed at Stage #1 (603A). As similarly described throughout this disclosure above, the variable power divider 620A may divide the input port I1 into a first waveguide branch 619A and a second waveguide branch 619B, as an example. As shown, the first and the second waveguide branches 619A and 619B may connect to a second and a third variable power dividers 620B and 620C, respectively, which are disposed at Stage #2 (603B), as an example. The second and the third variable power dividers 620B and 620C, respectively, may divide/split each waveguide branch 619A and 619B, respectively, into subsequent pairs of waveguide branches, as an example. As shown as an example, the variable power divider 620B may divide the first waveguide branch 619A into waveguides 629A and 629B, and the variable power divider 620C may divide the second waveguide branch 619B into waveguides 629C and 629D, for example.

As mentioned previously above, the transmitter chip 601 may comprise n stages of cascaded variable power dividers 620. As shown in FIG. 6, following the second stage 603B variable power dividers 620B and 620C a plurality of variable power dividers may be disposed on the transmitter chip 601 and interconnect between the waveguide pairs 629A and 629B and 629C and 629D, respectively, and the variable power dividers 620, respectively, disposed at Stage #n (603N), for example. It should be understood that any number of variable power dividers may be provided between Stage #2 and Stage #n, and that each variable power divider may branch an input waveguide branch into a pair of corresponding waveguide branches, as similarly described above. As shown, following the variable power dividers 620 at Stage #n (603N), which is the last stage of cascaded variable power dividers, for example, a plurality of optical channels 612 may be provided, as indicated, from two minimum optical channels up to $2^n$ optical channels, where n corresponds to the number of stages of cascaded variable power dividers, as mentioned previously above. As shown in FIG. 6, each optical channel 612 may be provided with a first photodetector PD, optically connected via a tap coupler 609, with the total number of photodetectors 610A corresponding to the total number of optical channels 612, that is, a $2^n$ number of photodetectors 610A, for example. It should be understood that each optical channel of the plurality of optical channels may directly or indirectly connect to a variable power divider (for power tuning and channel shut-off capabilities, for example).

As shown in FIG. 6, the plurality of optical channels 612 may further comprise a plurality of functional blocks 630, each functional block having a modulator (e.g., 507 in FIG. 5) and a phase shifter (e.g., 508 in FIG. 5). It should be understood that, depending on the particular application, additional or fewer optical components may be provided in the functional blocks 630, as desired. As shown, following the set of functional blocks 630, a second set of photodetectors 610B may be provided on the plurality of optical channels 612 and optically connected via tap couplers 609, for example, the number of second photodetectors PD being $2^{n+1}$, as indicated. Finally, as shown as an example, each optical channel may conclude with an output port 615 disposed at an output end 601B of the integrated transmitter chip 601, the output ports 615 being adapted to couple optical light, and therefore optical power, out of the transmitter chip 601. As indicated, the total number of output ports 615 may correspond to the total number of optical channels, which depends on the number of stages 603N, and is defined by $2^n$, for example.

As described similarly throughout this disclosure above, the variable power dividers (e.g., 620) may be realized using tunable couplers (1×2 or 2×2 tunable couplers, for example), for example, having adjustable splitting ratios. As previously discussed, optical signals traversing through the variable power dividers are split, such that their respective optical powers are divided according to the adjusted splitting ratio. Furthermore, as also described previously, the splitting ratios may be electrically controlled by an external computer programmed with a control algorithm for setting the splitting ratios of each of the tunable couplers, as appropriate.

As an example, let the transmitter chip 601 shown in FIG. 6 comprise 3 stages of cascaded variable power dividers, such that n=3, for example. As such, the transmitter chip 601 may thus comprise seven variable power dividers (e.g., tunable couplers), with four of the seven variable power dividers being disposed at the third stage (i.e., 603N), eight optical channels 612, sixteen total photodetectors PD, with a first eight being disposed at 610A and a second eight being disposed at 610B, eight functional blocks 630, and finally, eight output ports 615. As such, modifying the control algorithm described previously when referring to FIG. 2 for the single laser case, let there be eight power output targets P1-P8 corresponding to laser light signals being output from the eight output ports O1-O8, respectively, for this particular example. Accordingly, for example, to properly set the variable power dividers, such that to enable a pre-defined power output target P1-P8 at the output end 601B of the transmitter chip 601, where P1-P8 each define the output power target for each of the eight optical channels 612, let the splitting ratio of the four variable power dividers disposed at Stage #3, in this example, be set to P1/P2, P3/P4, P5/P6, and P7/P8, respectively. The splitting ratios of the second and the third variable power dividers 620B and 620C, respectively, may then be adjusted to (P1+P2)/(P3+P4) and (P5+P6)/(P7+P8), respectively, for example. The splitting ratio of the first variable power divider 620A may then be adjusted to (P1+P2+P3+P4)/(P5+P6+P7+P8), for example. Finally, the input laser source may be adjusted until the laser light outputs all are equal to or substantially equal to the output power targets P1-P8 for the output ports O1-O8, respectively, as desired.

The control algorithm programmed and running on the external computer may thus be modified appropriately, as described above per the example, to accommodate a plurality of alternative embodiments of the single-input, multi-channel, n-stage transmitter chip shown in FIG. 6, depending on the number of stages of cascaded variable power dividers provided, for example. Thus, the method of the tuning the splitting ratios of the variable power dividers such that to control the output power of the transmitter chip is not limited to 4-channel transmitter chips and may therefore be applied to transmitter chips having any number of optical channels, as an advantage. It should be understood that, if desired and/or necessary, to achieve certain power uniformity capabilities, a greater or lesser number of variable power dividers may be disposed at Stages #1 and #2, etc., than those shown in FIG. 6, as an example. As will be described in detail below, the integrated transmitter chip shown in FIG. 6 may be configured to accommodate multiple laser sources, rather than solely the single laser case described herein above.

Figure 7:
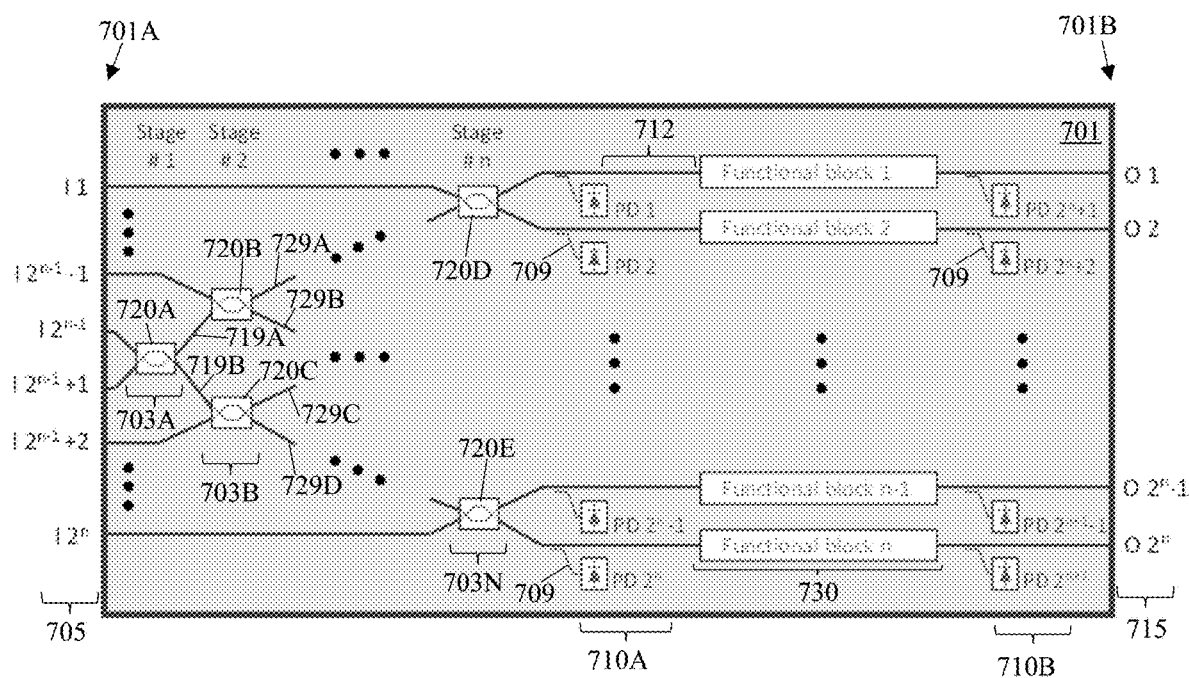
FIG. 7 is a diagram illustrating a top view of a multi-input integrated multi-channel transmitter chip having n-stage cascaded variable power dividers, according to several aspects.

FIG. 7 is a diagram illustrating a top view of a multi-input integrated multi-channel transmitter chip 701 having n-stage cascaded variable power dividers 720, according to several aspects. As shown in FIG. 7, the integrated multi-channel transmitter chip 701 may comprise a plurality of input port 705, defined according to the number of stages of cascaded variable power dividers, as will be discussed in more detail below, and disposed along a first end 701A. Thus, as will be described in detail below, the transmitter chip 701 shown in FIG. 7 may be configured specifically for transmitting optical power originating from a plurality of laser sources (i.e., one, two or more) and may thus be an alternative embodiment of that shown previously in FIG. 1, as an example.

As shown, the integrated transmitter chip 701 may comprise an n number of stages of cascaded variable power dividers 720, as similarly shown in FIG. 6, for example. As opposed to the previously described embodiments of the disclosed multi-input integrated transmitter chip, the embodiment 701 shown in FIG. 7 showcases that many more than three variable power dividers may be provided on a single chip, as needed, depending on the size of the chip and the number of optical channels 712, for example. As indicated in FIG. 7, the plurality of input ports 705 may each be adapted to receive laser light, and, as stated above, the number of input ports 705 being defined according to the n number of stages. As shown as an example, each input port (e.g., I1-I2$^n$) may optically extend and connect to a variable power divider (e.g., 720) disposed at a stage (e.g., Stage #1) 703A-703N along the integrated transmitter chip 701. For example, a first input port I1 may optically connect to a top-most variable power divider 720D, and the last input port I2$^n$ may optically connect to a bottom-most variable power divider 720E, as shown. As similarly described throughout this disclosure above, each variable power divider (e.g., 720A, 720B) may divide their respectively connected input port (e.g., I1) into a first waveguide branch and a second waveguide branch, as an example. For example, referring to variable power divider 720A disposed at Stage #1 (703A), which may be realized using a 2×2 tunable coupler, a first and a second input ports (labeled I2$^{n-1}$ and I2$^{n-1}$+1) may each be optically branched, as shown, into a first and a second waveguides 719A and 719B, respectively. As such, laser light signals being launched into input ports I2$^{n-1}$ and I2$^{n-1}$+1 may each be divided/split (according to the splitting ratio of variable power divider 720A) and directed respectively through waveguides 719A and 719B, for example. It should be understood that, depending on the number of input ports and the configuration of the transmitter chip 701, each of the variable power dividers provided may be 2×2 or 1×2 tunable couplers, as needed, as an example.

As shown, referring still to variable power divider 720A, the first and the second waveguide branches 719A and 719B may connect to a second and a third variable power dividers 720B and 720C, respectively, which are disposed at Stage #2 (703B), as an example. The second and the third variable power dividers 720B and 720C, respectively, may divide/split each waveguide branch 719A and 719B, respectively, into subsequent pairs of waveguide branches, as an example. As shown as an example, the variable power divider 720B may divide the first waveguide branch 719A into waveguides 729A and 729B, and the variable power divider 720C may divide the second waveguide branch 719B into waveguides 729C and 729D, for example. Each of the second and the third variable power dividers 720B and 720C may be realized using 2×2 tunable couplers in this example. It should be understood that, if desired and/or necessary, to achieve certain power uniformity capabilities, a greater or lesser number of variable power dividers may be disposed at Stages #1 and #2, as an example.

As mentioned previously above, the transmitter chip 701 may comprise n stages of cascaded variable power dividers 720. As shown in FIG. 7, following the second stage 703B variable power dividers 720B and 720C a plurality of variable power dividers may be disposed on the transmitter chip 701 and interconnect between the waveguide pairs 729A and 729B and 729C and 729D, respectively, and the variable power dividers 720C and 720D, respectively, disposed at Stage #n (703N), for example. It should be understood that any number of variable power dividers may be provided between Stage #2 and Stage #n, and that each variable power divider may branch an input waveguide branch into a pair of corresponding waveguide branches, as similarly described above. As shown, following the variable power dividers 720 at Stage #n (703N), which is the last stage of cascaded variable power dividers, for example, a plurality of optical channels 712 may be provided, as indicated, from the minimum 2$^{n-1}$+1 optical channels up to a maximum of 2$^n$ optical channels, where n corresponds to the number of stages of cascaded variable power dividers, as mentioned previously above. As shown in FIG. 7, each optical channel 712 may be provided with a first photodetector PD, optically connected via a tap coupler 709, with the total number of photodetectors 710A corresponding to the total number of optical channels 712, that is, a 2$^n$ number of photodetectors 710A, for example. It should be understood that each optical channel of the plurality of optical channels may directly or indirectly connect to a variable power divider (for power tuning and channel shut-off capabilities, for example). It should also be understood that, when the n number of stages is large, some waveguide crossing may be required due to the increased layout complexity of the integrated transmitter chip. Such waveguide crossings are omitted from the diagram of FIG. 7 for simplicity.

As shown in FIG. 7, the plurality of optical channels 712 may further comprise a plurality of functional blocks 730, as previously described when referring to FIG. 6, each functional block having a modulator (e.g., 507 in FIG. 5) and a phase shifter (e.g., 508 in FIG. 5). It should be understood that, depending on the particular application, additional or fewer optical components may be provided in the functional blocks 730, as desired. As shown, following the set of functional blocks 730, a second set of photodetectors 710B may be provided on the plurality of optical channels 712 and optically connected via tap couplers 709, for example, the number of second photodetectors 710B being $2^n$, as indicated. Finally, as shown as an example, each optical channel may conclude with an output port 715 disposed at an output end 701B of the integrated transmitter chip 701, the output ports 715 being adapted to couple optical light, and therefore optical power, out of the transmitter chip 701. As indicated, the total number of output ports 715 may correspond to the total number of optical channels, which depends on the number of stages 703N, as mentioned above, and is defined by $2^n$, for example.

As described similarly throughout this disclosure above, the variable power dividers (e.g., 720) may be realized using tunable couplers, for example, having adjustable splitting ratios. As previously discussed, optical signals traversing through the variable power dividers are split, such that their respective optical powers are divided according to the adjusted splitting ratio. Furthermore, as also described previously, the splitting ratios may be electrically controlled by an external computer programmed with a control algorithm for setting the splitting ratios of each of the tunable couplers, as appropriate.

As an example, let the transmitter chip 701 shown in FIG. 7 comprise 3 stages of cascaded variable power dividers, such that n=3, for example. As such, the transmitter chip 701 may thus comprise eight input ports 705, seven variable power dividers (e.g., tunable couplers), with four of the seven variable power dividers being disposed at the third stage (i.e., 703N), eight optical channels 712, sixteen total photodetectors PD, with a first eight being disposed at 710A and a second eight being disposed at 710B, eight functional blocks 730, and finally, eight output ports 715. It should be understood that not all eight of the input ports I1-I8 may necessarily be used during any given operation of the transmitter chip 701. As similarly described previously above when referring to FIG. 6, the control algorithm shown previously in FIG. 2 may be modified from the dual laser case to appropriately accommodate the now 8-channel transmitter chip in this example. As such, let there be eight power outputs P1-P8 corresponding to laser light signals being output from the eight output ports O1-O8, for this particular example. Accordingly, for example, to properly set the variable power dividers, such that to enable a power output target P1-P8 for each of the output ports O1-O8, respectively, at the output end 701B of the transmitter chip 701, where P1-P8 each define the output power target for each of the eight optical channels 712, let the splitting ratio of the four variable power dividers disposed at Stage #3, in this example, be set to P1/P2, P3/P4, P5/P6, and P7/P8, respectively. The splitting ratios of the second and the third variable power dividers 720B and 720C, respectively, may then be adjusted to (P1+P2)/(P3+P4) and (P5+P6)/(P7+P8), respectively, for example. Finally, each of the input laser sources (e.g., minimum of one laser source) may be adjusted until the laser light outputs are all equal to or substantially equal to output power targets P1-P8 for the output ports O1-O8, respectively, as desired.

The control algorithm programmed and running on the external computer may thus be modified appropriately, as described above per the example, to accommodate a plurality of alternative embodiments of the multi-input, multi-channel, n-stage transmitter chip shown in FIG. 7, depending on the number of stages of cascaded variable power dividers provided, for example. Thus, the method of tuning the splitting ratios of the variable power dividers such that to control the output power of the transmitter chip is not limited to 4-channel transmitter chips having three input ports and may therefore be applied to transmitter chips having any number of optical channels, as an advantage.

As described throughout this disclosure above, the tuning of the variable power dividers may be achieved by various suitable means, such as, for example, electro-optic effect, thermo-optic effect, magnetic-optic effect, mechanical effect, MEMS, etc. As an example, the tuning can be further optimized or improved using various approaches, such as using differential thermo-optic phase shifting, and/or using undercuts or trenches for lower power consumption. While the tuning of the tunable couplers has been described herein as being controlled and achieved by a computer control algorithm, the tuning may alternatively be controlled manually (e.g., by a user). Additionally, the transmitter chip and the optical components described herein may be applicable to various integrated photonics platforms, such as, for example, those based on silicon, silicon nitride, silica, lithium niobate, polymer, III-V materials, hybrid material platforms, etc. The transmitter chip disclosed herein may be used with optical signals at wavelength ranges other than O-band, such as, for example, the visible light range, or E, S, C and/or L-bands. In addition, the disclosed transmitter chip may be used for other optical applications than power transmission for data-center applications, such as, for example, optical communications, optical sensing, optical computing, automotive applications, quantum applications, etc.

It should be understood that, as used throughout this disclosure above, percentages stated with reference to the splitting ratios of the tunable couplers are idealized and exemplary, and that in practice the divided percentages of the input power may be lower than actually stated due to natural loss, error, etc. It should be noted that the laser sources used herein may be any suitable type of laser, such as, for example, semiconductor-based lasers, fiber-based lasers, gas-based lasers, etc., as needed for the optical application. It should also be understood that other light sources may be used other than a laser, as described above. For example, it may be possible for a light-emitting diode (LED), amplified spontaneous emission (ASE) source, or any other suitable light source, to be utilized with the integrated transmitter chip disclosed herein above. It should also be understood that the illustrated size of the transmitter chip, as well as the sizes of the various optical components, is not drawn to scale and should therefore not be interpreted or limited as such. It should also be understood that, as shown in FIG. 4, for example, a fewer or greater number of photodetectors may be used with the transmitter chip disclosed herein. Furthermore, while it was mentioned above that germanium photodetectors are used in the disclosed invention, it should be understood that any suitable type of photodetector may be used. While MZI modulators are depicted throughout the drawings herein, it should be understood that any suitable type of modulator may be used, such as, for example, ring modulator, directional coupler modulator, photonic crystal modulator, Bragg grating modulator, electro-absorption modulator, etc.

It may be advantageous to set forth definitions of certain words and phrases used in this patent document. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

As used throughout this application above, the phrases "laser light," "laser light beam," "light beam," "laser signal," "optical signal," and the like are interchangeable. Each of the aforementioned phrases and/or terms are intended to refer generally to forms of light, and more specifically, electromagnetic radiation used in the fields of optics and integrated photonics. As also used herein, the term "power" is to be interpreted as the power, in milliwatts, for example, of the laser signals being transmitted via the transmitter chip. Thus, if reference is made to the power of a particular optical channel or output port, it is to be understood as meaning the power of the laser signal travelling through said particular optical channel or output port, for example. Additionally, as used throughout this disclosure above, the phrases "variable power divider" and "tunable coupler" are used interchangeably.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An integrated transmitter chip comprising:
at least one input port disposed at a first end of the integrated transmitter chip;
a first variable power divider optically connected to a first input port of the at least one input port, the first variable power divider being tunable to a first splitting ratio;
a second and a third variable power dividers each optically connected to the first variable power divider, the second and the third variable power dividers being tunable to a second and a third splitting ratios, respectively; and
a first and a second optical channels being optically branched from the second variable power divider, and a third and a fourth optical channels being optically branched from the third variable power divider;
wherein the integrated transmitter chip is adapted to support PAM signals; and
wherein an optical signal being launched into the first input port and having an input power is caused to be split by the first variable power divider into a first and a second optical signals, such that the input power is portioned between the first and the second optical signals according to the first splitting ratio, the first and the second optical signals subsequently being propagated toward the second and the third variable power dividers, respectively, and being caused to be split by the second and the third variable power dividers, respectively, into a first and a second pairs of output optical signals each having an output power, the output powers of the first and the second pairs of output optical signals each being portioned according to the second and the third splitting ratios, respectively.

2. The integrated transmitter chip of claim 1, wherein the PAM signals are non-return-to-zero (NRZ) PAM4 signals, and the integrated transmitter chip further comprises a first, a second, a third, and a fourth output ports disposed at a second end of the integrated transmitter chip, the first, the second, the third, and the fourth output ports being optically aligned and connected to the first, the second, the third, and the fourth optical channels, respectively.

3. The integrated transmitter chip of claim 1, further comprising:
- a set of modulators and a set of phase shifters optically connected to the first, the second, the third, and the fourth optical channels, such that a first modulator of the set of modulators and a first phase shifter of the set of phase shifters are optically connected to the first optical channel; and
- a set of photodetectors optically connected to the first, the second, the third, and the fourth optical channels, such that a first photodetector of the set of photodetectors is optically connected to the first optical channel, the set of photodetectors being spatially disposed after the second and the third variable power dividers on the integrated transmitter chip.

4. The integrated transmitter chip of claim 3, wherein each photodetector of the set of photodetectors is adapted to measure a power of an optical signal propagating along each of the first, the second, the third, and the fourth optical channels.

5. The integrated transmitter chip of claim 1, wherein the first, the second, and the third splitting ratios are each tunable in a range from 100/0 to 0/100.

6. The integrated transmitter chip of claim 1, wherein the first, the second, and the third variable power dividers are cascaded, such that the first variable power divider is disposed at a first distance from the first end, and the second and the third variable power dividers are disposed at a second distance from the first end.

7. The integrated transmitter chip of claim 6, wherein the first distance is smaller than the second distance.

8. The integrated transmitter chip of claim 1, wherein the first variable power divider is a 1×2 tunable coupler, and the second and the third variable power dividers are 2×2 tunable couplers.

9. The integrated transmitter chip of claim 1, wherein the first, the second, the third, and the fourth optical channels are parallelly and equally distributed on the integrated transmitter chip, such that a distance between the first optical channel and the second optical channel is half a distance between the first optical channel and the third optical channel.

10. An integrated transmitter chip comprising:
- at least an input port, disposed at a first end of the integrated transmitter chip;
- at least one variable power divider optically connected to one of the at least an input port, the at least one variable power divider being tunable to a selective splitting ratio; and
- a plurality of optical channels extending a length of the integrated transmitter chip, a first and a second optical channels of the plurality of optical channels being optically branched from the at least one variable power divider;
- wherein, when an optical signal having an input power is being launched into the one of the at least an input port, the optical signal is caused to selectively, automatically, and in real-time, be split by the at least one variable power divider into a plurality of output optical signals, such that the input power is portioned among the plurality of output optical signals according to the selective splitting ratio, thus selectively, automatically, and in real-time tuning an output power of each output optical signal being transmitted via the integrated transmitter chip.

11. The integrated transmitter chip of claim 10, wherein the at least one variable power divider consists of a first and a second variable power dividers, the first and the second variable power dividers being tunable to a first and a second splitting ratios, respectively, wherein the first and the second variable power dividers are optically connected to a first and a second input ports of the at least an input port, and wherein a first and a second optical channels of the plurality of optical channels are optically branched from the first variable power divider, and a third and a fourth optical channels of the plurality of optical channels are optically branched from the second variable power divider.

12. The integrated transmitter chip of claim 11, wherein the first and the second variable power dividers are 1×2 tunable couplers.

13. The integrated transmitter chip of claim 10, further comprising a plurality of output ports disposed at a second end of the integrated transmitter chip, each of the plurality of output ports being optically aligned and connected to each of the plurality of optical channels.

14. The integrated transmitter chip of claim 10, further comprising:
- a set of modulators and a set of phase shifters optically connected to each of the plurality of optical channels, such that a first modulator of the set of modulators and a first phase shifter of the set of phase shifters are optically connected to a first optical channel; and
- a set of photodetectors optically connected to the plurality of optical channels, such that a first photodetector of the set of photodetectors is optically connected to the first optical channel, the set of photodetectors being disposed spatially after the at least one variable power divider.

15. The integrated transmitter chip of claim 14, wherein each photodetector of the set of photodetectors is adapted to measure a power of an optical signal propagating along each of the plurality of optical channels.

16. The integrated transmitter chip of claim 11, wherein the first and the second splitting ratios are each tunable in a range from 100/0 to 0/100.

17. A method of transmitting an optical signal having an input power using an integrated transmitter chip, the integrated transmitter chip comprising at least an input port, at least one variable power divider optically connected to one of the at least an input port, the at least one variable power divider being tunable to a selective splitting ratio, a plurality of optical channels, at least a portion of the plurality of optical channels being optically branched from the at least one variable power divider, and a plurality of photodetectors each optically connected to each of the plurality of optical channels, the method comprising in any order the steps of:
- defining output power targets for the plurality of optical channels;
- tuning the splitting ratio of the at least one variable power divider, the splitting ratio being tunable from a range between 100/0 to 0/100, the tuning of the splitting ratio causing an optical portioning among the at least a portion of the optical channels according to the tuned splitting ratio;
- launching the optical signal into the one of the at least an input port, the optical signal being propagated through the at least one variable power divider, the at least one variable power divider causing a splitting of the optical signal into a plurality of output optical signals, the plurality of output optical signals each having an output power portioned from the input power according to the tuned splitting ratio, the plurality of output optical signals being propagated along the plurality of optical channels, respectively; and measuring in real-time, while the integrated transmitter chip is in operation, the output powers of the plurality of output optical signals via the plurality of photodetectors, respectively, to monitor and automatically adjust in real-time, while the integrated transmitter chip is in operation, the tuned splitting ratio and thus the portioning of the input power by the at least one variable power divider, hence adjusting in real-time the output powers of the plurality of output optical signals of the integrated transmitter chip.

18. The method of claim 17, wherein the at least one variable power divider is a first, a second, and a third variable power dividers, the first, the second, and the third variable power dividers being tunable to a first, a second, and a third splitting ratios, respectively, the first variable power divider being optically connected to a first input port of the at least an input port, and the second and the third variable power dividers being optically connected to the first variable power divider.

19. The method of claim 18, wherein the integrated transmitter chip further comprises:
- a first and a second optical channels of the plurality of optical channels being optically branched from the second variable power divider;
- a third and a fourth optical channels being optically branched from the third variable power divider; and
- a first, a second, a third and a fourth photodetectors of the plurality of photodetectors optically connected to the first, the second, the third and the fourth optical channels, respectively.

20. The method of claim 19, further comprising:
- defining output power targets P1, P2, P3 and P4 for the first, the second, the third and the fourth optical channels, respectively;
- tuning the second and the third splitting ratios of the second and the third variable power dividers, respectively, to P1/P2 and P3/P4, respectively, the tuning of the second and the third splitting ratios causing an optical portioning of the first and the second, and the third and the fourth optical channels according to the tuned second and third splitting ratios, respectively;
- launching the optical signal having the input power into the first input port, the optical signal being split into a first and a second pairs of output optical signals by the first, the second, and the third variable power dividers;
- tuning the first splitting ratio of the first variable power divider to (P1+P2)/(P3+P4), the tuning of the first splitting ratio causing an optical portioning of the first input port according to the tuned first splitting ratio;
- measuring the output powers of the first and the second pairs of output optical signals via the first and the second, and the third and the fourth photodetectors, respectively, such that to monitor the portioning of the input power by the first, the second and the third variable power dividers and the transmitting of the optical signal via the first and the second pairs of output optical signals; and
- adjusting the input power of the launched optical signal until the output powers of the first and the second pairs of output optical signals are equal to the pre-defined output targets P1, P2, P3 and P4.

* * * * *